United States Patent [19]
Ducommun et al.

[11] 4,212,541
[45] Jul. 15, 1980

[54] METHOD AND APPARATUS FOR TESTING A FORWARD-MOVING STRAND

[75] Inventors: Jöel Ducommun, Chavannes; Philippe Vulliens, Palézieux-Gare, both of Switzerland

[73] Assignee: Baumgartner Papiers S.A., Crissier, Switzerland

[21] Appl. No.: 917,502

[22] Filed: Jun. 21, 1978

[30] Foreign Application Priority Data
Jun. 21, 1977 [CH] Switzerland ............... 7627/77

[51] Int. Cl.² .................................. G01D 21/04
[52] U.S. Cl. ............................. 356/430; 250/572
[58] Field of Search ............ 356/429, 430, 432, 440; 250/571, 572

[56] References Cited
U.S. PATENT DOCUMENTS
4,001,579  1/1977  Lebet et al. ............ 250/572

Primary Examiner—John K. Corbin
Assistant Examiner—R. A. Rosenberger
Attorney, Agent, or Firm—Eric P. Schellin

[57] ABSTRACT

In a method for testing a continuously forward-moving strand a light beam which passes along a plane that extends approximately perpendicularly to the longitudinal axis of the strand is introduced into the strand. The brightness value is measured on a place of the strand exterior which is distal from the light incidence place by means of at least one photoelectronic element disposed directly on the strand exterior and the measured result is evaluated in a gating circuit which is electrically connected to the photoelectronic element.

8 Claims, 16 Drawing Figures

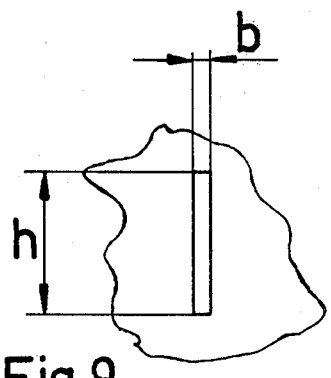
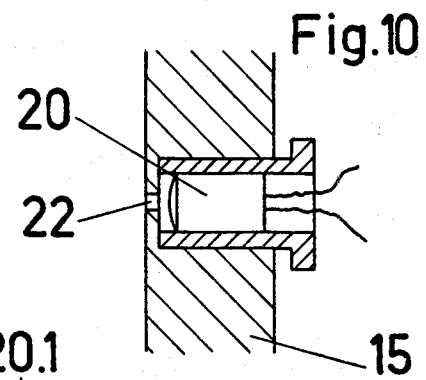
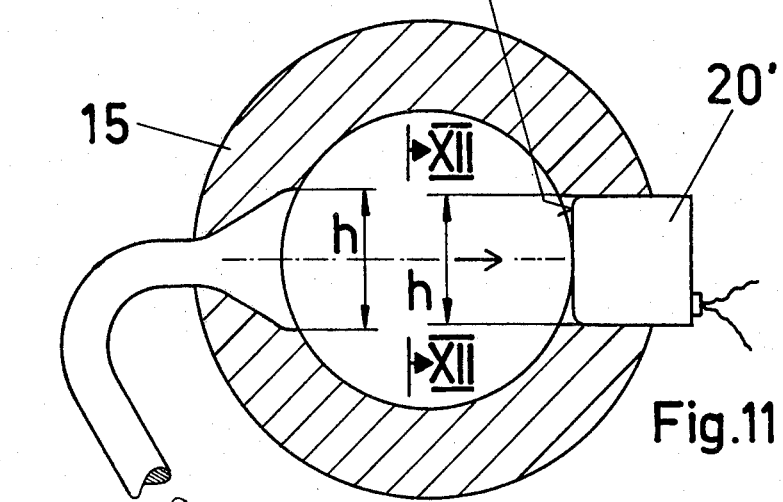
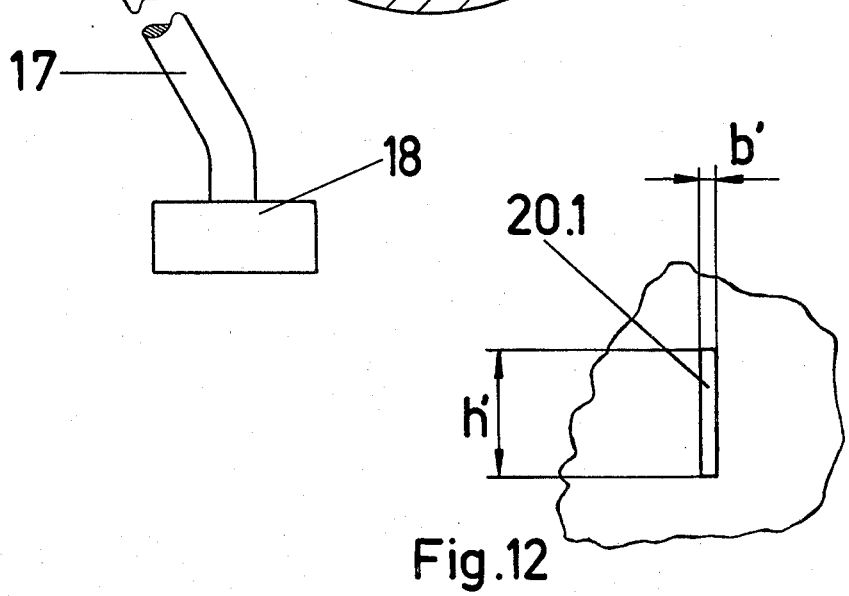

4,212,541

METHOD AND APPARATUS FOR TESTING A FORWARD-MOVING STRAND

FIELD OF THE INVENTION

The invention relates to a method for testing a continuously forward-moving strand, such as a cigarette filter strand, in which portions of a different material consistency and/or shape follow each other alternately and continuously, an apparatus for performing the method and use of the method.

BACKGROUND OF THE INVENTION

In the production of cigarette filters, which have at least two portions of different material consistency when viewed along their longitudinal extent, there is a difficulty that the filter rods cut off from the continuously produced cigarette filter strand must not only have a constant length but also that the cuts must also be made always at the same place of a specific filter portion so that identical filter rods of the same defined composition can be obtained.

The prior art already discloses a method for controlling the cutting device of a cigarette filter production machine in which the filter strand is capacitatively tested by means of a high-frequency electric field. However, at high filter strand speeds of up to 2 m/s and more this method produces insufficiently sharply defined measuring signals, a feature which makes very precise control of the cutting speed impossible at high filter strand speeds.

SUMMARY OF THE INVENTION

It is an object of the present invention to provide a method which produces sharply defined measuring signals even at very high strand speeds to permit, for example, precise control of a filter strand cutting device and/or of an ejector device for ejecting faulty filter rods.

In a method of the kind described hereinbefore this problem is solved in accordance with the invention in that a light beam which passes along a plane that extends approximately perpendicularly to the longitudinal axis of the strand is introduced into the strand, the brightness value is measured on a place of the strand exterior which is distal from the light incidence place disposed at least approximately in the same plane that contains the light beam, by means of at least one photoelectronic element disposed directly on the lastmentioned place and the measured result is evaluated in a gating circuit which is electrically connected to the photoelectronic element.

The subject of the invention also relates to apparatus for performing the method according to the invention characterized in that it comprises means for introducing at least one light beam that passes along a plane extending at least approximately perpendicularly to the longitudinal filter strand axis, at least one photoelectronic element disposed at least approximately in the light beam plane to define the brightness value at a place of the outside of the filter strand to be tested, which said place is distal from the light incidence place, and a gating circuit which is electrically connected to the photoelectronic element.

It is convenient that the means for introducing the light beam into the strand to be tested are arranged so that the light beam direction extends through the light-sensitive receptor part of the photoelectronic element.

It is convenient that the means for introducing the light beam into the strand to be tested are constructed so that the light beam has a rectangular cross-section extending transversely to the conveying direction of the strand, the width of the said cross-section does not exceed 1.2 mm, preferably no more than 0.8 mm, and the length amounts to at least three times the width.

To test a strand sheathed with a transparent sheething strip it can be convenient that the means for introducing the light beam into the strand which is to be tested are oriented on a light-reflecting surface disposed in the plane of the light beam and the said surface is arranged so that the optical path of the reflected beam extends through the light-sensitive receptor part of the photoelectronic element.

The subject of the invention also relates to a use of the method according to the invention to control a cutting device which subdivides a filter strand into individual filter rods.

BRIEF DESCRIPTION OF THE DRAWINGS

The invention will be further described by way of example with reference to the accompanying drawings in which:

FIG. 9 is a view along the line IX—IX of FIG. 7, FIG. 10 shows to an enlarged scale the portion A of FIG. 8, FIG. 11 is a cross-section through a second exemplified embodiment of a system according to the invention, FIG. 12 is a view along the line XII—XII of FIG. 11.

DETAILED DESCRIPTION

Figure 1:
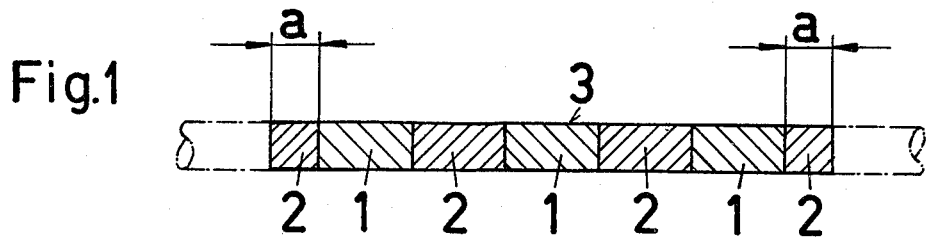
FIG. 1 is a longitudinal section through an exemplified embodiment of a correctly produced filter rod.

As can be seen by reference to FIG. 1 the successive filter plugs 1 and 2 of a filter rod 3 composed of two different kinds of filter plugs 1 and 2 bear without clearance against each other by means of their endfaces and the two plug parts 2' disposed at the end of the filter rod 3 have exactly the same length a which corresponds to half the length of an uncut filter plug 1 or 2. The filter plug 1 consists, for example of acetate and the filter plug 2 of cellulose acetate, hereinafter briefly referred to as cellulose.

Figure 2:
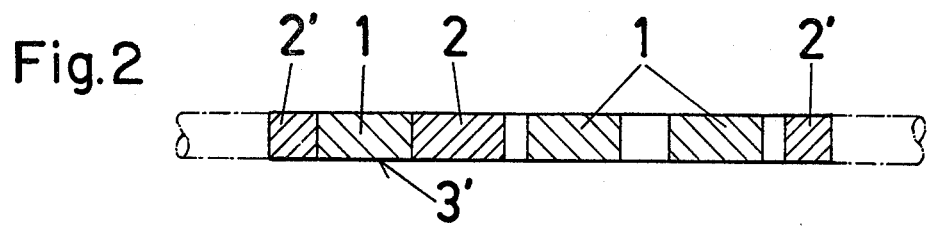
FIGS. 2 and 3 are longitudinal sections through filter rods, by analogy to FIG. 1, but with manufacturing faults.
Figure 3:
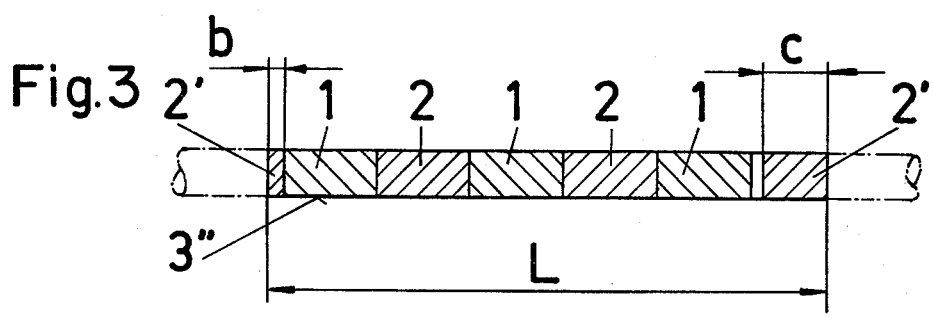

The faults which occur most frequently in the manufacture of the filter rod 3, illustrated in FIG. 1, apart from an incorrect diameter, are illustrated in FIGS. 2 and 3 and in the filter rod 3' illustrated in FIG. 2 a filter plug 2 is missing and in the filter rod 3 illustrated in FIG. 3 the cuts for subdividing the filter strand into individual filter rods 3 are not performed at the correct place of the filter strand despite the filter rod length being correct to that the plug parts 2' and 2" disposed at the ends of the filter rod 3" have different lengths (c b). If the filter rod 3' is subsequently divided in the conventional manner into six cigarette filters of equal length three of the cigarette filters will have insufficient filter material in the filter plug 2 and three cigarette filters will have insufficient filter material in the filter plug 1, i.e. the filtration result will comply with the calculated values.

Figure 4:
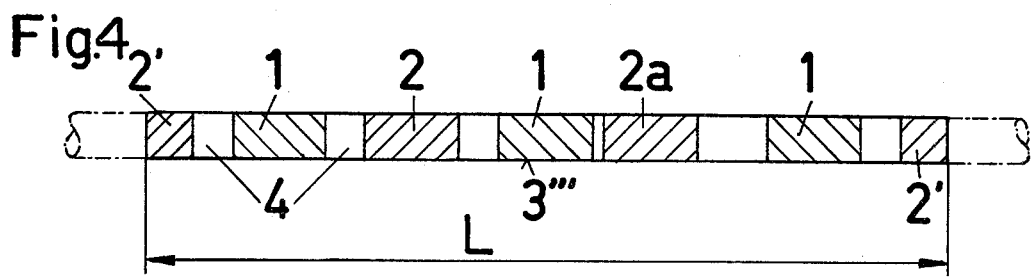
FIGS. 4 and 5 are longitudinal sections through filter rods containing chamber filters with manufacturing faults.

FIG. 4 shows a chamber filter rod 3'" in which two kinds of filter plug 1 and 2 and chambers 4, filled with granulate, are disposed serially in alternating configuration. In this faulty filter rod 3'" the filter plug 2a is not situated at the correct distance from the adjacent filter plug 1 so that partially faulty cigarette filters are produced when the said filter rod 3'" is cut into six equal portions, i.e. the final length of the cigarette filter which is to be mounted on the tobacco part of the cigarette.

Figure 5:
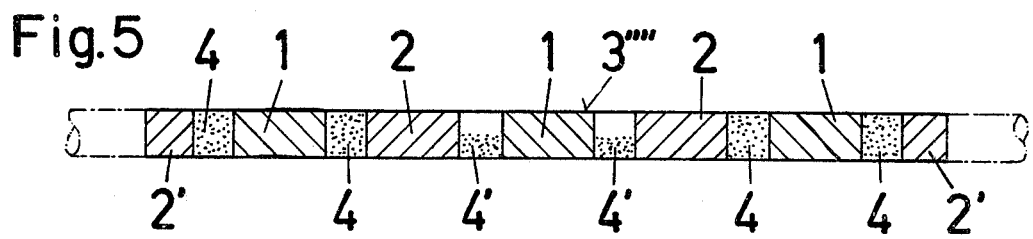

A few chambers 4' are only incompletely filled with granulate in the faulty chamber filter rod 3"" shown in FIG. 5.

The faulty filter rods illustrated in FIGS. 2 to 5 are only a few examples of manufacturing faults which occur in the manufacture of cigarette filter rods so that the faults which are to be detected by the subsequently described devices can be clearly understood.

Figure 6:
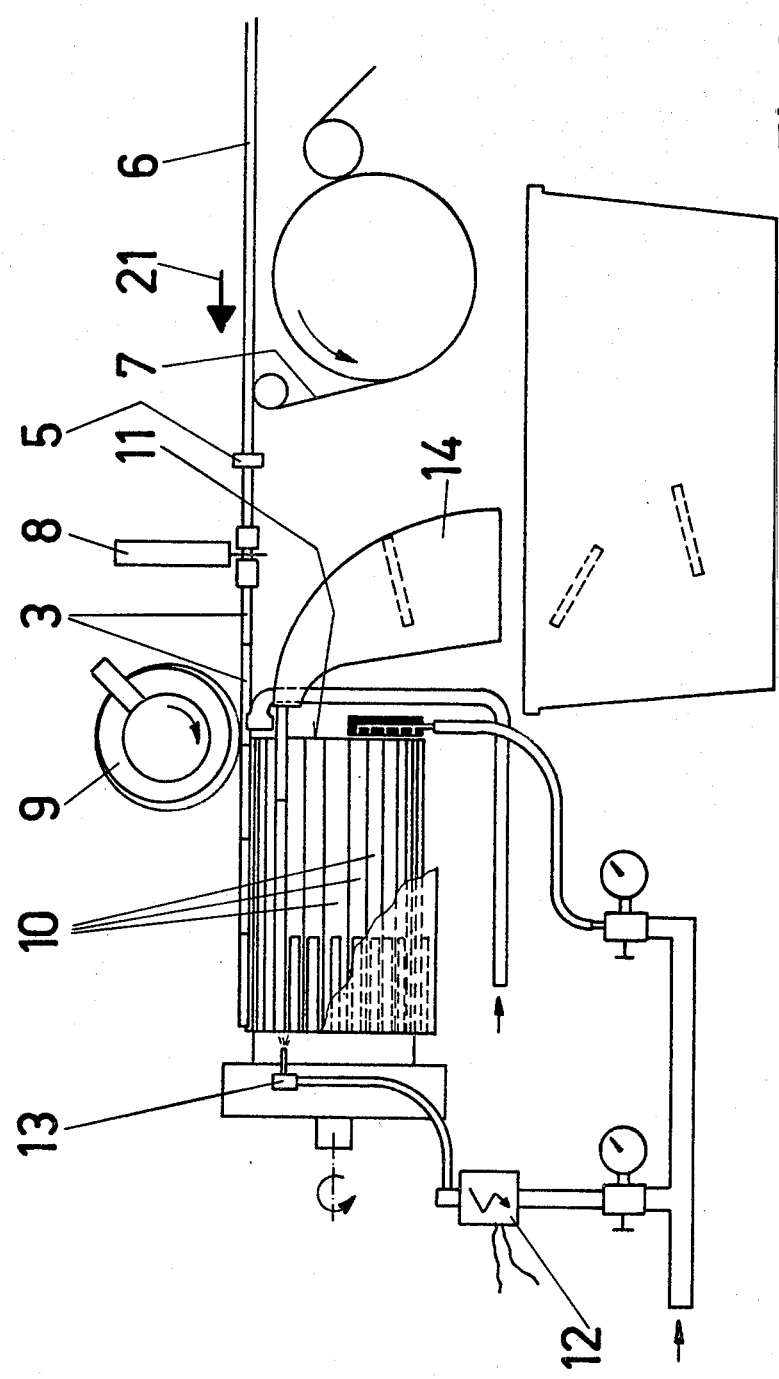
FIG. 6 is a side view of part of a cigarette filter production machine to display the arrangement of the system according to the invention.
Figure 7:
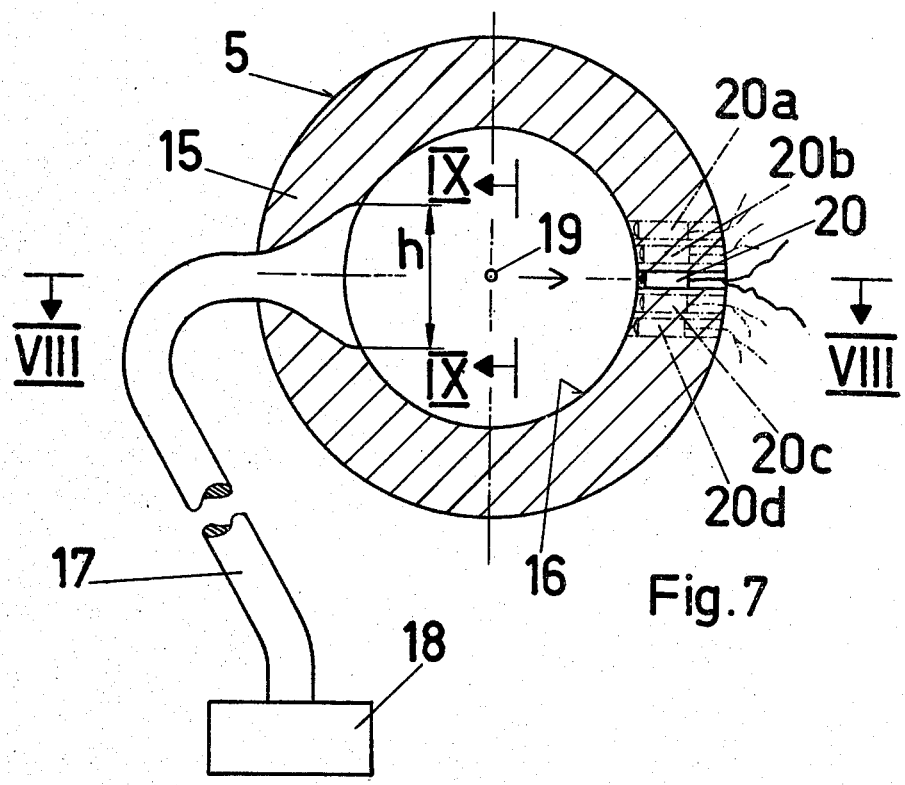
FIG. 7 is a cross-section through a first exemplified embodiment of apparatus according to the invention.
Figure 8:
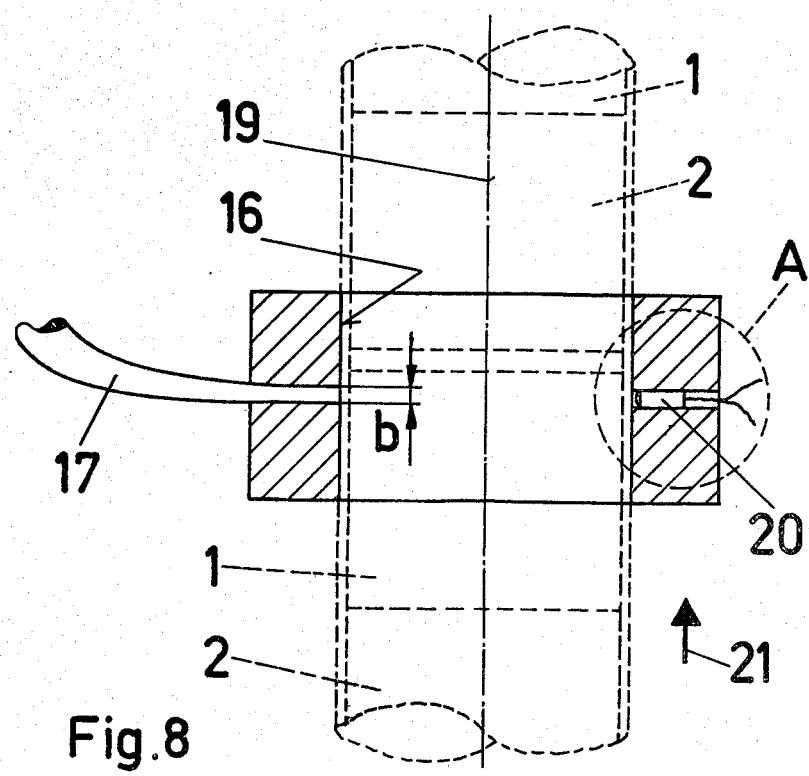
FIG. 8 is a section along the line VIII—VIII of FIG. 6.

FIG. 6 shows the end part of a filter strand manufacturing machine to show the position of the arrangement of the system 5 illustrated in FIGS. 7 to 9.

As can be seen by reference to FIG. 6 the filter strand 6 is moved forward by means of an endless conveyor belt 7 through an annular measuring head 5 and is divided into individual filter rods 3 by means of a cutting device 8 which is mounted downstream of the last-mentioned measuring head. Thereafter each of the individual filter rods 3 is introduced in known manner by means of a distribution wheel 9 into a receiver groove 10 of a rotating receiver cylinder 11 and at the bottom position thereof they are delivered to a conveyor belt which extends laterally of the filter rods 3 with respect to the filter strand direction. The said receiver cylinder 11 is associated with an air nozzle 13, controlled by an electromagnetically actuated control valve 12, so that faulty filter rods 3 can be conveyed by means of an air jet, in FIG. 6, to the right into the ejector chute 14. To control the valve 12 the measuring head 5 is electrically connected thereto via a gating circuit (not shown). The said pneumatically operating ejector system can be constructed, for example, as described in the Swiss patent application No. 7626/77 of June 21, 1977.

As can be seen by reference to FIGS. 7 to 9 the measuring head 5 illustrated therein is provided with an annular guide member 15 through which the cigarette filter strand 6 is guided practically without clearance for the purpose of being tested. The inwardly oriented surface 16 of the guide member 15 is treated or coated so that the light beams impinging thereon are not reflected.

It has been found even better if the entire guide member 15 is constructed of a material which does not reflect light. A very suitable material of this kind is an epoxy resin sold by Messrs. 3M under the trade name "Scotchcast" which is extruded during manufacture under vacuum in order to avoid air inclusions in the finished guide member 15 which would falsify the measured result.

The light generated in the light generator 18 by means of a halogen lamp is introduced into the filter strand 6 for testing by means of a glass fibre strand 17 consisting of optical fibres perpendicularly to the longitudinal filter strand axis 19 and the outside of the continuously passing filter strand is scanned for transmitted light by means of a photodiode 20 which is disposed diametrically on the opposite side of the filter strand 6 and therefore on the opposite side of the guide member 15.

To prevent any damage to the optical fibre strand 17 due to excessive heating it is convenient if in all the subsequently described embodiments an infra-red filter is disposed between the lamp of the light generator 18 and the light entry side of the optical fibre strand 17 so that the infra-red proportion in the light to be transmitted is reduced to a harmless amount.

As can be seen by reference to FIGS. 7, 8 and 9 the optical fibre strand 17 is flattened on its light exit side so that in the direction of motion 21 of the filter strand 6 a very narrow light beam of, for example, 1 mm width is produced. As can be seen by reference to FIG. 9 the light exit side of the optical fibre strand 17 has a rectangular shape of width b and height h. In the example the width b is 1 mm and the height approximately 3 mm. The diameter of the photodiode 20 is, for example, approximately 0.4 mm. In this way a very accurate and sharply defined measured signal of the greatest possible amplitude is obtained by means of the photodiode.

To obtain an even more sharply defined measuring signal it is also possible to arrange the photodiode 20, illustrated in the section A of FIG. 4, behind an orifice diaphragm 22 of, for example, 0.2 mm diameter, as can be seen by reference to FIG. 10 so that even the slightest inaccuracy in the passing filter strand can be detected, precisely located and the magnitude of the inaccuracy can be precisely defined because the photodiode 19 arranged in this manner produces a measuring signal with a high information content.

To obtain a stronger measuring signal it is also possible to arrange a plurality of photodiodes 20, 20a, 20b, 20c and 20d in a line one behind the other as shown in dash-dot lines in FIG. 7.

If a solar cell is employed in place of the photodiodes it will be convenient if, as can be seen by reference to FIGS. 11 and 12, a solar cell 20' is used whose light-sensitive surface part 20.1, like the light exit side of the optical fibre strand 17, has a rectangular shape (FIG. 9), conveniently with the same side-length ratio b:h as the light exit cross-section of the optical fibre strand 17. To this end however it will be convenient if the dimensions of the light-sensitive surface part 20.1 of the solar cell 20' are slightly smaller than the light exit cross-section of the optical fibre strand 17, so that $b > b'$ and $h > h'$.

If the filter rods 3 are to be produced in accordance with FIG. 1 and a filter plug is missing from the filter strand 6 which passes through the measuring head 5 a very strong light signal will strike the photodiode 21 when the faulty place passes to that with the aid of a gating circuit connected to the said photodiode the ejector system 12,13 illustrated in FIG. 6 will be actuated and the faulty filter rod 3' is eliminated. To ensure that the faulty filter rod 3' has been eliminated the gating circuit can also be constructed so that approximately three to four filter rods 3 disposed in the receptor cylinder upstream and downstream of the faulty filter rod 3' are also ejected.

Since the cellulose plugs and acetate plugs 2 ord 1 respectively have a different light transmissibility the photodiode 20 will deliver a pulse signal which is at least approximately of square wave in the course of the continuous passage of the filter strand 6 of such composition and such signal can be employed for the precise control of the cutting device 8 in order to avoid the production of faulty filter rods 3'' as illustrated in FIG. 3.

In the production of a filter strand with a transparent sheath it is also possible to reflect the light beam 23, oriented into the filter strand duct, from a reflecting place 24 on the opposite place of the inwardly oriented guide surface 16 of the measuring hand 5 and to measure the brightness intensity of the reflected beam 25 by means of the photodiode 20. In this way the brightness difference between the two passages of the light beam through a filter plug and the two passage of the light beam through an empty place will be greater than that obtained with the devices illustrated in FIGS. 7 to 9.

Figure 13:
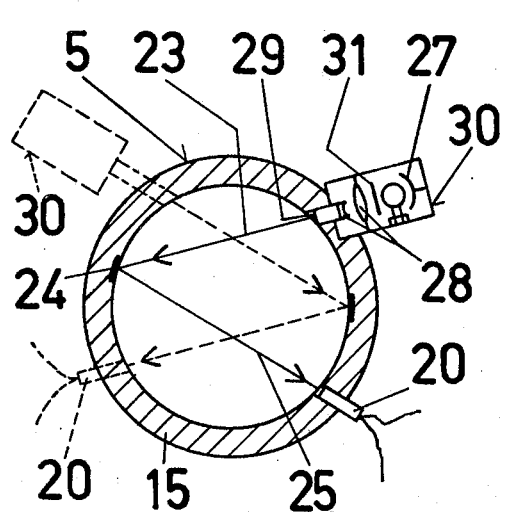
FIG. 13 is a cross-section through a third exemplified embodiment of a system according to the invention.

In the arrangement illustrated in FIG. 13 the light beams emitted by a halogen lamp 26 are focused by means of a mirror 27 and a lens system 28 and the resultant light beam is limited by means of a diaphragm 29 to an exit light beam 23 of the desired shape. An infra-red filter 31 is disposed between the lamp 26 and the lens system 28 to reduce the infra-red proportion of the light beam 23.

Other means for introducing a light beam 23 into the filter strand 6 which is to be tested are of course also possible. As shown in broken lines in FIG. 13 the operational reliability can be improved by the provision of two identical measuring systems in the measuring head 5 to which end the measuring signals are conveniently compared with each other and a filter strand portion detected as being faulty is subsequently eliminated only when the measured results coincide.

Figure 14:
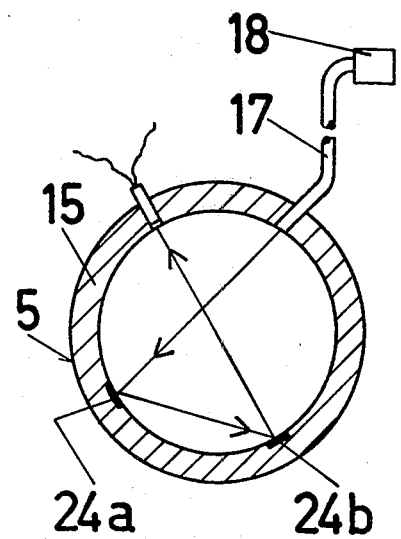
FIG. 14 is a cross-section through a fourth exemplified embodiment of a system according to the invention.

FIG. 14 shows an embodiment which is analogous to FIG. 13 but in which the measured light beam is reflected twice. In this arrangement the difference of light intensity which is incident on the photodiode 20 between the approximately triple passage of the light beam through a filter plug 1 or 2 and the passage to an empty place is even greater than in the embodiment according to FIG. 13.

Figure 15:
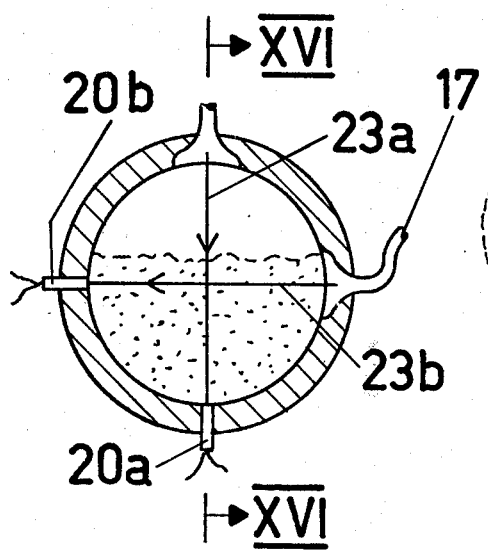
FIG. 15 is a cross-section through a further exemplified embodiment of a system according to the invention.
Figure 16:
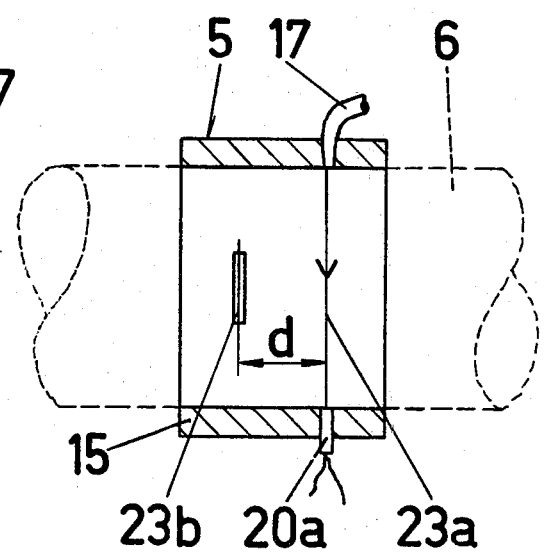
FIG. 16 is a section along the line XVI—XVI of FIG. 15.

FIGS. 15 and 16 show a measuring head for monitoring a chamber filter strand 6. Two light beams 23a and 23b which intersect and are situated at a distance d from each other in the longitudinal orientation of the filter strand 6 are used and the light beam 23a is normally used as the measuring beam and the light beam 23b is used as the reference beam to test the filling rate of the chambers 4 filled with granulate. If the chambers 4 are completely filled with granulate both photodiodes 20a and 20b will detect identical light intensities independently of the kind of granulate employed.

If one chamber is only partially filled with granulate owing to a defect in the granulate filling part (see also FIG. 5, chamber 4') the photodiode 20a associated with the light beam 23a which extends in the vertical direction relative to the photodiode 20b which is associated with the horizontally extending light beam 23b will indicate a higher light intensity and by means of the gating circuit which is electrically connected to both photodiodes 20a, 20b will cause the faulty filter strand portion to be ejected. If the chamber 4' is filled with granulate only beneath the horizontally extending light beam 23b or is not filled at all the light intensity striking the photodiode 20b will be greater than is normally the case and a level circuit incorporated in the gating circuit will then also cause the faulty filter strand portion to be eliminated when a specific level has been exceeded. The correct sequence of the filter plugs 1 and 2 consisting of different material and the relative distance between them can also be monitored with the same measuring head 5 and the cutting device can be controlled in synchronism with the filter plugs 1 and 2.

To achieve sharply defined measuring signals in all embodiments it is important that the photodiode 20 is arranged in the guide member 15 so that it is situated as close as possible to the outside of the filter strand 6 while the latter passes through and that no light-absorbing elements, for example an optical fibre bundle, are situated between the outside of the sheathing of the filter strand 6 and the photodiode 20.

Optimum conditions are obtained if the photodiode 20 is arranged so close to the passing filter strand 6 that it just fails to touch the outside of the filter strand and is thus not subjected to mechanical wear or if a diaphragm according to FIG. 10 is disposed in front of the photodiode 20 and this diaphragm bears on the outside of the filter strand 6 in order to precisely define the light beam which is to be transmitted.

If the operator of a cigarette filter production machine with two magazines, one of which contains acetate rods and the second magazine of which contains cellulose rods, mistakes the magazine containers when the magazines are topped up, the cut performed by the cutting device 8 which follows after transfer to the topped-up rods will be undesirably made through an acetate plug instead of through a cellulose plug in terms of the example illustrated in FIG. 1. With the aid of the preferred device, it will be readily possible to monitor the passing filter strand for the correct sequence of the alternately provided filter plugs consisting of different materials and in the event of incorrect synchronization with the cutting device 8 to eliminate the incorrectly cut filter rods by means of the ejector system 10 to 14 (FIG. 6) and secondly, given sufficient adjustability, to adjust the cutting operation of the cutting device 8 to the correct synchronization with the passing filter strand to be cut or to stop the machine.

The method according to the invention can be used not only for monitoring a continuously passing filter strand but any other continuously forward-moving strand in which portions of different material consistency and/or shape follow each other in a continuous alternation, for example in the production of ink cartridges for writing instruments, can be tested in the same manner.

What I claim is:

1. Apparatus for testing a continuously forward-moving strand, such as a cigarette filter strand, in which portions having different optical characteristics follow each other sequentially, said apparatus comprising:
    an optical testing station located along the longitudinal path of said forward-moving strand;
    means including a ring-shaped body at said station, tightly encircling and confining said filter strand so as to guide the strand steadily and without whipping or vibration at said station as the strand moves forward;

said ring-shaped body being made of a polymeric resin manufactured under vacuum so as to be homogeneous and have no light-reflecting microscopic voids;

said resin being of a dark color which absorbs light;

a source of illuminating light located remotely from said ring-shaped body;

said ring-shaped body having, in a plane perpendicular to the longitudinal axis of said forward-moving strand, a radial bore;

optical fiber light conduction means guiding light from said source of illuminating light and through said radial bore to the surface of said forward-moving strand;

a cavity in said ring-shaped body located in the same plane, perpendicular to the longitudinal axis, as said radial bore, said cavity having an opening, in said plane, on the interior bore of said ring-shaped body;

photoelectric sensing means located in said cavity and responsive to light entering said cavity through said hole;

said photoelectric sensing means being located immediately adjacent said hole and being optically very tightly coupled to the light entering said hole;

said radial bore and said opening being so located, in said plane perpendicular to the longitudinal axis, that illuminating light from the optical fiber light conducting means in said radial bore beams and diffuses through said forward-moving strand to said opening;

whereby said photoelectric sensing means responds only to light which has traversed through said forward moving-strand; and whereby the amount of light which reaches said photoelectric sensing means, from said remote source of illumination, as modulated by said forward-moving strand, is sufficient to produce an ample response 2. Apparatus in accordance with claim 1, in which said ring-shaped body is made of an epoxy polymer.

3. Apparatus in accordance with claim 1, in which:
the said light conducting fibers deliver to the surface of said forward-moving strand a rectangular area of illumination having lesser dimension of about 8/10 millimeter in the direction of motion and a larger dimension, transverse to said motion and lying in said plane, at least three times greater; and said photoelectric sensing means comprises means defining a photosensitive area, inscribed in a rectangular region, with the lesser dimension parallel to direction of motion and a larger dimension transverse to said motion and lying in said plane.

4. Apparatus in accordance with claim 3 in which the height to width ratio of the said rectangular area of illumination is substantially the same as the height to width ratio of the said rectangular region of the photoelectric sensing means.

5. Apparatus in accordance with claim 4 in which the size of said rectangular region is somewhat smaller than the size of said rectangular area.

6. Apparatus in accordance with claim 1, comprising further:
light reflective means located, on the interior surface of said ring-shaped body, and in said plane;

said radial bore, reflective means and said opening being relatively located so that illuminating light from the optical fiber light conducting means in said radial bore beams and diffuses through said forwarding-moving strand to said light reflective means and from thence to said opening;

to thereby illuminate said photoelectric sensing means after having twice traversed said forward-moving strand.

7. Apparatus in accordance with claim 1, in which said opening has a maximum dimension of approximately 4/10 millimeter;

whereby said opening acts as an optical aperture stop or diaphragm with respect to the light reaching said photoelectric sensing means.

8. Apparatus in accordance with claim 1 in which said forward movement of said strand is in a generally horizontal direction;

said radial bore through said ring-shaped body is disposed in a generally horizontal plane;

said ring-shaped body being provided with a second radial bore, disposed in a second plane, perpendicular to the longitudinal axis of said forward-moving strand, close to the plane, perpendicular to the longitudinal axis of said forward-moving strand of the first mentioned radial bore;

said second radial bore being further disposed in a generally vertical plane;

said second radial bore having further an associated source of illuminating light, optical fiber light conduction means, a cavity, an opening and photoelectric sensing means arranged similarly to those associated with the first mentioned radial bore;

whereby optical tests are made on said horizontally forward-moving strand at closely spaced cross sections, one on a horizontal diameter and one on a vertical diameter.

* * * * *